Sept. 8, 1959    H. I. SLONE    2,902,902
REMOTE CONTROL MIRROR ASSEMBLY
Filed Sept. 17, 1956
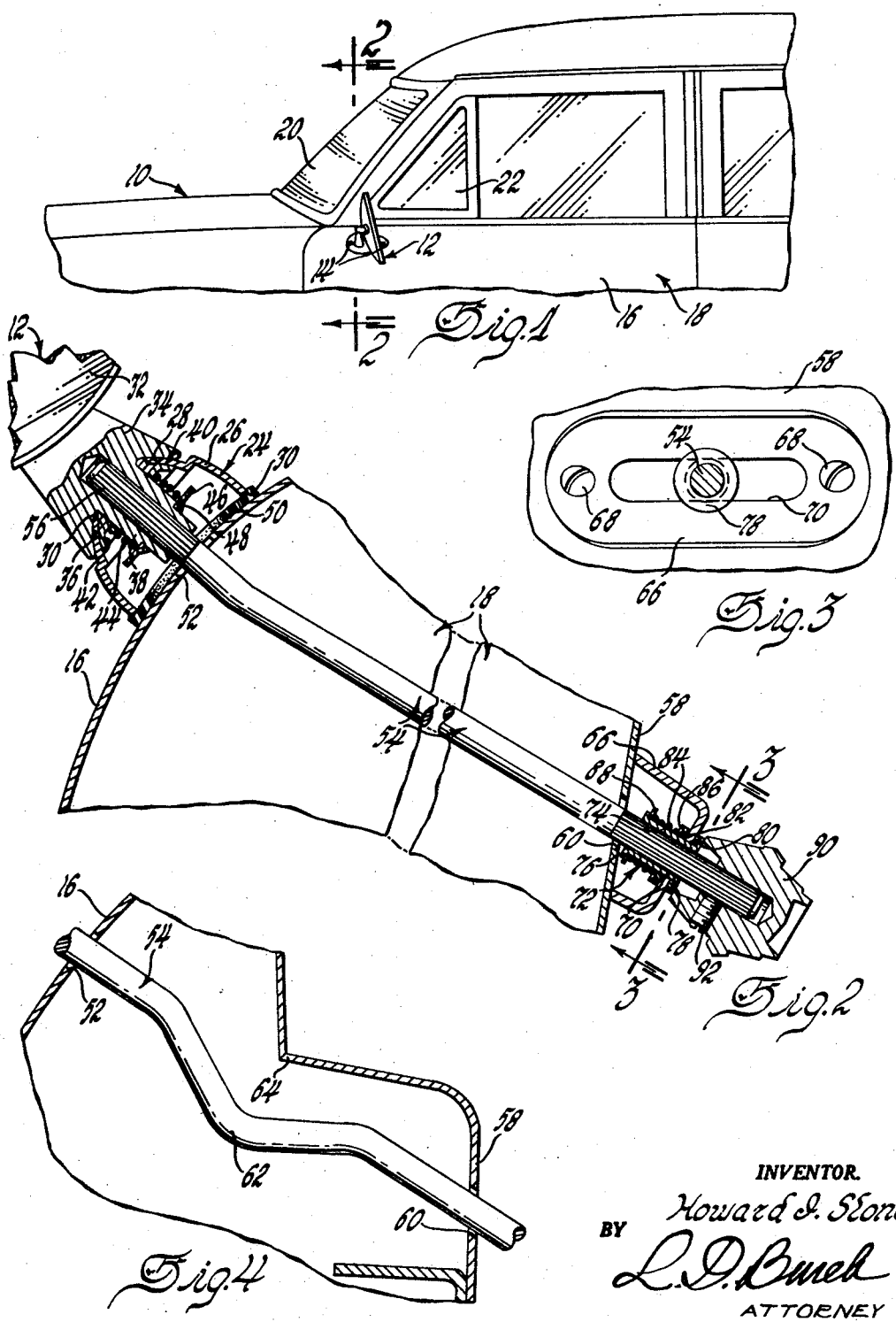
INVENTOR.
Howard I. Slone
BY L. I. Burell
ATTORNEY

United States Patent Office 2,902,902
Patented Sept. 8, 1959

2,902,902
REMOTE CONTROL MIRROR ASSEMBLY

Howard I. Slone, Alexandria, Ind., assignor to General Motors Corporation, Detroit, Mich., a corporation of Delaware Application September 17, 1956, Serial No. 610,057

1 Claim. (Cl. 88—93)

This invention relates to rear view mirrors in general and more particularly to remote controlled rear view mirror assemblies.

Outside rear view mirrors used with automotive vehicles often require minor adjustment to suit different vehicle drivers. Most rear view mirrors require one to reach outside the vehicle and grasp the mirror head in order to readjust it. Mirrors which include remote adjusting controls have been suggested but have generally included too complicated a mechanism which is both expensive to manufacture and to install.

It is here proposed to provide a remote control mirror assembly which is compact, simple, efficiently operative and yet inexpensive to manufacture and exceedingly simple to install.

The proposed mirror assembly includes pivotally connected mirror supporting members which are secured to the outside of a vehicle wall and have means disposed within one of the supporting members for frictionally engaging the other thereto. A control rod is extended through the outside vehicle wall and its spaced inner panel where it is received through a slotted guide plate. The guide plate includes a friction bushing through which the control rod extends and which biases the rod in rattle-free engagement relative to the guide plate and against inadvertent movement relative thereto. The friction bushing is preassembled with the guide plate and is disposed wholly within the protection of the guide plate and outside of the inner wall panel. The proposed mirror assembly thus requires no access between the panels, enables maximum preassembly, and greatly minimizes the cost of installation.

In the drawings:

Figure 1 is a fragmentary view of a vehicle body having the proposed mirror assembly mounted thereon.

Figure 2 is an enlarged cross-sectioned view of the proposed mirror assembly taken through the vehicle wall of the vehicle body of Figure 1 in the plane of line 2—2 and looking in the direction of the arrows thereon.

Figure 3 is an end view of the guide plate of the proposed mirror assembly taken in the plane of line 3—3 of Figure 2 and looking in the direction of the arrows thereon.

Figure 4 is a cross-sectioned view through the vehicle wall showing an optional modification which may be included in the proposed mirror assembly.

The automotive vehicle 10 is shown to include an outside rear view mirror 12 mounted as by fastener means 14 to the side wall 16 of the vehicle, more particularly the vehicle door 18, just rearwardly of the windshield 20 and forwardly of the side exhaust vent window 22 on the driver's side of the vehicle.

The mirror assembly 12 includes a base or mirror supporting member 24 having a spherical raised portion 26 formed to provide a ball joint 28 having an access 30 formed centrally therethrough. The mirror head 32 is secured to a supporting arm 34 which has a socket joint 36 formed near the end thereof. The mirror member is retained to the supporting member 24 by having the necked down end 38 of the arm 34 extend through access 30, seating the socket joint 36 on the ball joint 28, and is retained by biasing means 40 provided within the spherical portion 26 of the supporting member and engaging the extended end 38 of the mirror supporting arm.

The biasing means 40 includes a spring cup washer 42 disposed about the extended end 38 of the arm 34 and held in frictional engagement with the underside of the ball joint 28, by a coil spring 44 engaged with a spring retaining washer 46 secured to the end of the arm at the shoulder stop 48 provided therefor. Such biasing means is compactly disposed wholly within the mirror base member 24 and enables assembly of the mirror head and base member prior to installation on a vehicle.

The mirror supporting base member 24 is received against the vehicle side wall 16 upon a gasket member 50 and over a small hole 52 provided through the wall. The mirror control rod 54 is received through the opening 52 and is press fitted into the end of the mirror supporting arm 34 as is shown at 56. The control rod extends through the vehicle door 18 toward the inner side wall panel 58 and through an elongated opening 60 provided therein to receive the rod.

The control rod 54 may be bent to provide a kink 62, as shown in Figure 4, between the wall panels 16 and 58 to avoid interference with any inwardly projecting shoulder such as 64 provided within one of the wall panels, and such kink will also serve to act as a stop against undue rotation of the mirror.

A guide plate 66, which may also be ornamental, is secured to the inner panel 58 of the vehicle door 18, within the passenger compartment, as by fastening means 68. The guide plate is provided with an elongated opening 70, aligned with that provided in the inner panel, and receives the end of the control rod 54 therethrough.

A friction bushing 72 is disposed about the end of the control rod as it is received through the guide plate 66 to prevent the rod from rattling against the edges of the plate opening 70 and secondarily to assist in biasing the rod in any given transverse positioning chosen therefor.

The friction bushing 72 includes a sleeve member 74 engaged upon the end of the control rod and having flanges 76 and 78 formed at opposite ends thereof and on opposite sides of the guide plate member. Small plastic washers 80 and 82 are provided on the sleeve on opposite sides of the edge of the guide plate opening 70 and a coil spring 84 is disposed thereon in compression between washers 86 and 88. The spring 84 acts against flange 76 and through washers 86 and 82 to bias the edge of the guide plate 66, about the guide slot 70, toward flange 78 of the sleeve member. The friction bushing is wholly received within the guide plate member which provides a compact assembly that may be preassembled just as mentioned in regard to the biasing means 40 at the outer wall panel 16.

A control knob 90 is secured to the terminal end of the control rod 54, by set screw 92 to provide a handle by which the mirror assembly may be operated. The mirror head 32 may be rotated within the limits of the shoulder stop 64 and may be pivoted forwardly or back within the limits of the guide slot 70.

The proposed mirror may be preassembled to such a large extent that installation on a vehicle requires no appreciable skill. The mirror supporting arm 34 and support member 24 are preassembled and checked to assure proper tensioning of the biasing means 40 while the friction bushing 72 is similarly preassembled and checked. All that remains on assembly is the drilling of the aligned openings 52 and 60, assembly of the control rod to the two units, and addition of the control knob. Repairs and adjustments are easily made since either of the units may be separately removed without affecting the other and in no instance is access between the spaced wall panels necessary.

I claim:

In a remote control mirror assembly having mirror head means and a control rod for said head means and controlling means for said control rod, said assembly being adapted to be mounted to two spaced walls so that said head means may be mounted externally to one of said walls with said control rod extending through said walls and said controlling means be mounted externally of the other of said walls; said mirror head means including a mirror supporting arm and a mirror attached thereto, a support member pivotally engaging and supporting said arm and secured externally to said one wall, and spring biasing means received within said support member and reacting against said support arm and said support member whereby said arm and said member are biased together and retained in any relatively pivoted position, one end of said control rod being secured to said supporting arm; said controlling means including a guide plate member secured externally to the other of said walls and having a guide slot provided therein and receiving said control rod therethrough, a bushing receiving said rod therethrough and extending through said guide slot and having a flange positioned externally of said guide plate and spring biasing means and washers at opposite ends of said spring biasing means received on said bushing internally of said guide plate member with one of said washers being mounted on the end of said bushing opposite said flange, said guide plate member having portions adjacent said slot received intermediate said flange and the other of said washers for operative frictional engagement therewith to retain said control rod in any laterally adjusted position within said slot, and handle means non-rotatably secured to the end of said control rod extending externally of said guide plate member for controlling lateral and rotatable movement of said rod to pivot said mirror; said mirror thereby being remotely adjustable and retained in any adjusted position.

References Cited in the file of this patent

UNITED STATES PATENTS

| | | |
|---|---|---|
| 1,328,064 | Vasselli | Jan. 13, 1920 |
| 1,752,642 | Larsen et al. | Apr. 1, 1930 |
| 2,540,427 | Charles et al. | Feb. 6, 1951 |
| 2,644,363 | Capitani | July 7, 1953 |
| 2,713,525 | Hinman | July 19, 1955 |
| 2,726,575 | Koonter | Dec. 13, 1955 |
| 2,746,355 | Wells | May 22, 1956 |
| 2,746,356 | Wells | May 22, 1956 |
| 2,766,083 | Fisher | Oct. 9, 1956 |